United States Patent
Carrere (10) Patent No.: US 9,534,539 B2
(45) Date of Patent: Jan. 3, 2017

(54) SUPPLY AND DRAIN DEVICE FOR AN INJECTOR

(71) Applicant: TURBOMECA, Bordes (FR)

(72) Inventor: Bernard Joseph Jean Pierre Carrere, Pau (FR)

(73) Assignee: TURBOMECA, Bordes (FR)

(*) Notice: Subject to any disclaimer, the term of this patent is extended or adjusted under 35 U.S.C. 154(b) by 0 days.

(21) Appl. No.: 14/432,967

(22) PCT Filed: Sep. 16, 2013

(86) PCT No.: PCT/FR2013/052116
§ 371 (c)(1),
(2) Date: Apr. 1, 2015

(87) PCT Pub. No.: WO2014/053721
PCT Pub. Date: Apr. 10, 2014

(65) Prior Publication Data
US 2015/0260106 A1 Sep. 17, 2015

(30) Foreign Application Priority Data

Oct. 1, 2012 (FR) ..................................... 12 59285

(51) Int. Cl.
*F02C 7/232* (2006.01)
*F16K 17/196* (2006.01)
(Continued)

(52) U.S. Cl.
CPC ............... *F02C 7/232* (2013.01); *F16K 17/18* (2013.01); *F16K 17/196* (2013.01); *F23K 5/147* (2013.01);
(Continued)

(58) Field of Classification Search
CPC ..... F16K 11/10; F02C 7/232; F23K 2301/203; F23D 2209/30; Y10T 137/7905; Y10T 137/7939; Y10T 137/7922
See application file for complete search history.

(56) References Cited

U.S. PATENT DOCUMENTS 2,986,159 A 5/1961 Snyder
3,498,056 A 3/1970 Avery
(Continued)

FOREIGN PATENT DOCUMENTS

GB 153 513 11/1920
JP 2 124379 10/1990

OTHER PUBLICATIONS

International Search Report and Written Opinion issued Nov. 20, 2013 in PCT/FR2013/052116 (with English translation of categories of cited documents and English translation of International Search Report previously filed).
(Continued)

*Primary Examiner* — Gerald L Sung
*Assistant Examiner* — Stefan Ibroni
(74) *Attorney, Agent, or Firm* — Oblon, McClelland, Maier & Neustadt, L.L.P.

(57) ABSTRACT

A device for a turbomachine chamber injector, including a conduit having at least a first opening, and a second opening (4), a blocking system for blocking the conduit, making it possible to regulate the passage of fluids into the conduit, the blocking system being configured to allow fuel to flow from the first opening to the second opening only from a first pressure of the fuel, for the passage of a supply of fuel, and allow air to flow from the second opening to the first opening only from a second pressure of the air, for the passage of purge air, the second pressure being greater than the first pressure.

8 Claims, 6 Drawing Sheets

(51) Int. Cl.
*F23K 5/14* (2006.01)
*F23K 5/18* (2006.01)
*F23R 3/28* (2006.01)
*F16K 17/18* (2006.01)

(52) U.S. Cl.
CPC . *F23K 5/18* (2013.01); *F23R 3/28* (2013.01); *F05D 2260/602* (2013.01); *F23D 2209/30* (2013.01)

(56) References Cited

U.S. PATENT DOCUMENTS

| 3,685,532 A | 8/1972 | Kasschau |
| 6,729,135 B1 * | 5/2004 | Norris ............... F02C 3/22 60/646 |
| 7,036,302 B2 * | 5/2006 | Myers, Jr. ............ F23R 3/343 60/39.281 |
| 2010/0263755 A1 | 10/2010 | Taylor et al. |

OTHER PUBLICATIONS

French Preliminary Search Report and Written Opinion issued Jun. 28, 2013 in Patent Application No. 1259285 (with English translation of categories of cited documents).
International Search Report Issued Nov. 20, 2013 in PCT/FR2013/052116 filed Sep. 16, 2013.

\* cited by examiner

SUPPLY AND DRAIN DEVICE FOR AN INJECTOR

FIELD OF THE INVENTION

The invention relates to a feeding and purging device for a combustion chamber injector of a turbomachine. The invention also relates to an injector for a turbomachine combustion chamber, and a turbomachine.

PRESENTATION OF THE PRIOR ART

The injectors of turbomachines are sensitive to deteriorations of the fuel by temperature.

This phenomenon, called coking, appears once the temperature of the fuel exceeds a critical threshold.

The injectors are sensitive to this phenomenon due to the perturbations of flow of the fuel, or even the obstruction, that are caused by this phenomenon.

The perturbations of flow due to coking have mechanical repercussions on the parts situated downstream of the injectors, but also on the quality of combustion.

Moreover, the obstructing of the injectors has an impact on the quality of spraying of the fuel, which is no longer uniform.

The combustion is then poor, which causes an increase in the pollution of the gases emitted by the turbojet, and even more serious problems including unavailability of the turbojet.

In order to protect the injector from coking, it is known to use devices allowing them to be purged during stopping of the turbomachine.

These devices make it possible to purge the injection ramp of fuel as well as the injectors by injection of compressed air.

Figure 1:
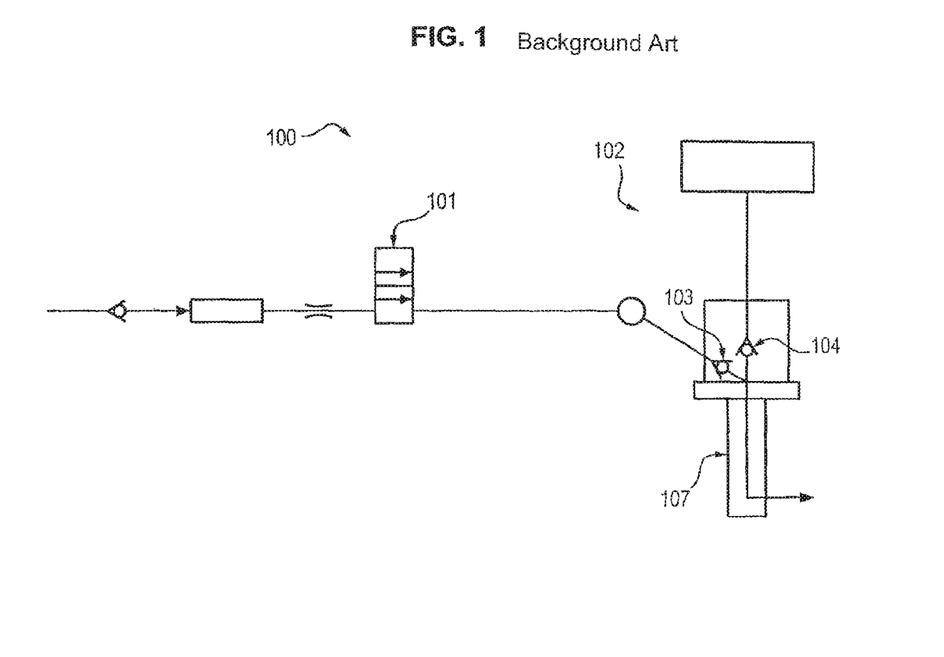
FIG. 1 shows a purge device according to the prior art.

In the systems of the prior art, like the one described in the applicant's FR 2871519, the purge device 100 including a circuit 101 for supplying compressed air, and a circuit 102 for supplying fuel, the two circuits being distinct and being connected in parallel at the entry of an injector 107. The compressed air supplying circuit 101 includes a check valve 103, and the circuit 102 for supplying fuel includes a check valve 104, preventing any return of purge air into the fuel supply circuit.

Moreover, in certain recent injectors, it is sometimes necessary to regulate supplying in fuel of the injectors depending on the pressure of the fuel.

In this case, the management of the supply of fuel and of the supply of purge air require, depending on the known state of the art, the use of a plurality of supply circuits associated with electrical control valves.

However, these solutions are bulky and complex, particularly due to the multiplication of the parts and of the circuits. In addition, they present increased risks of breakdowns.

PRESENTATION OF THE INVENTION

The invention proposes to compensate the aforementioned shortcomings.

To this end, there is described an injecting device for a turbomachine, characterized in that it includes a duct having at least one first opening and one second opening, and a duct blocking system allowing the passage of fluids in the duct to be regulated, the blocking system being configured to allow passage of the fuel from the first opening to the second opening based only from a first fuel pressure, for the passage of a supply of fuel, and to allow the passage of air from the second opening toward the first opening only from a second pressure of the air, for the passage of purge air, the second pressure being greater than the first pressure.

In one embodiment, the blocking system includes a first head mounted on a first elastic module, said first head being capable of displacing to allow the passage of the fuel from the first opening toward the second opening based on the first pressure.

In one embodiment, the blocking system includes a second head mounted on a second elastic module, said second elastic module being capable of moving to allow the passage of air from the second opening toward the first opening based on the second pressure.

In one embodiment, the first head is able to move inside the second head.

In one embodiment, the first head and the second head are capable of moving in translation in the duct, in opposite directions.

In one embodiment, the device includes a stop allowing blockage of displacement of the first head in the direction of displacement of the second head.

In particular, the first elastic module of the first head is fixed to an end of the second head, so that the displacement of the second head from the second pressure drives the displacement of the first head toward the stop.

The invention also relates to an injector of a combustion chamber of a turbomachine, characterized in that it includes a device such as that described previously, as well as a turbomachine including such an injector.

One advantage of the invention is to propose a simple and compact device.

Another advantage of the invention is to propose a unique and polyvalent device, adapted both to regulation of supplying with fuel and with purge air.

Yet another advantage of the invention is to propose a device allowing a complete purge.

Finally, another advantage of the invention is to rely on the use of simple and low-cost regulation tools.

PRESENTATION OF THE FIGURES

Other characteristics and advantages of the invention will also be revealed by the description that follows, which is purely illustrative and not limitative, and must be read with regard to the appended drawings on which.

DETAILED DESCRIPTION

Figure 2:
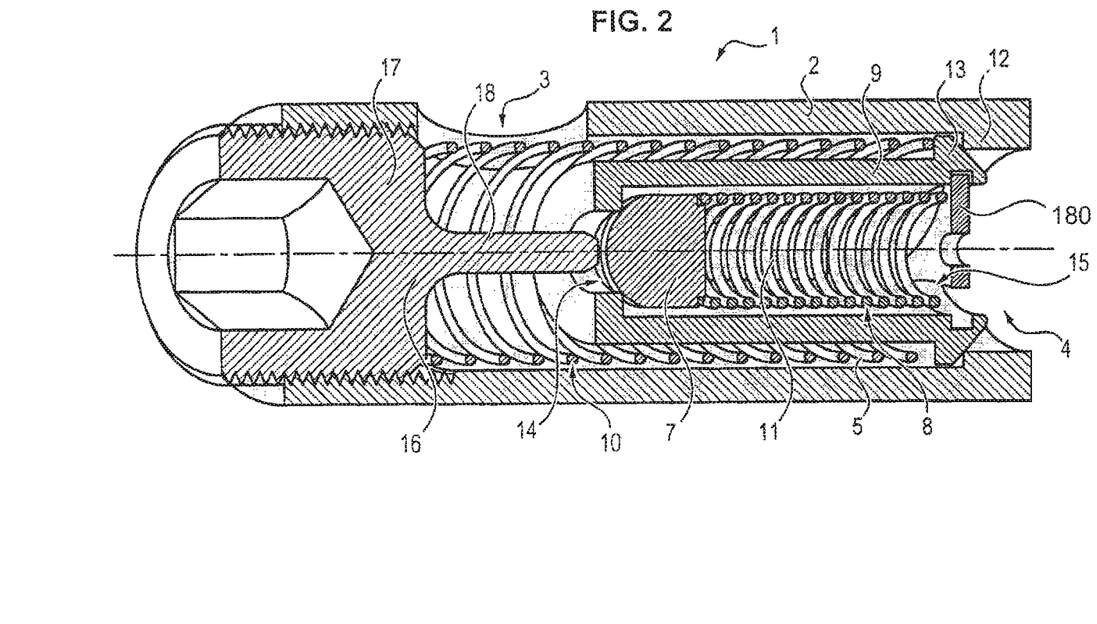
FIG. 2 shows in section an embodiment of a device according to the invention.
Figure 3:
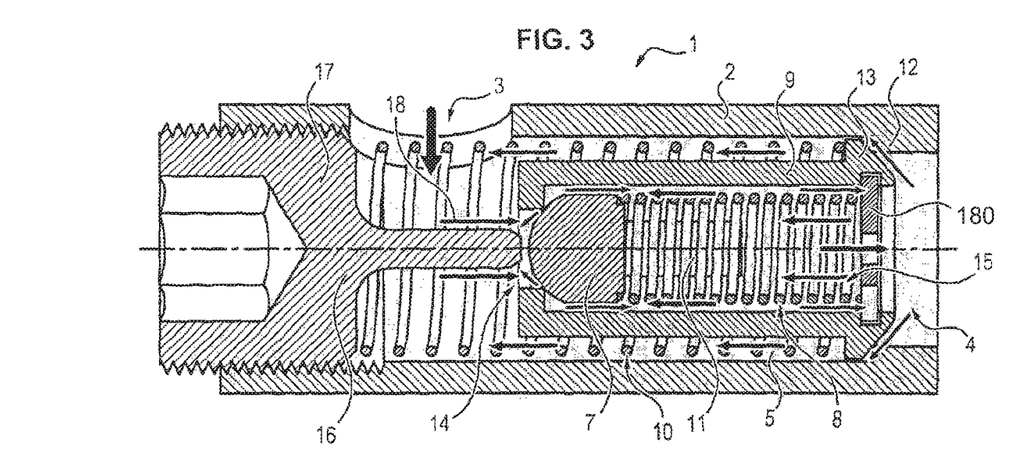
FIG. 3 shows in section an embodiment of a device of the invention.
Figure 4:
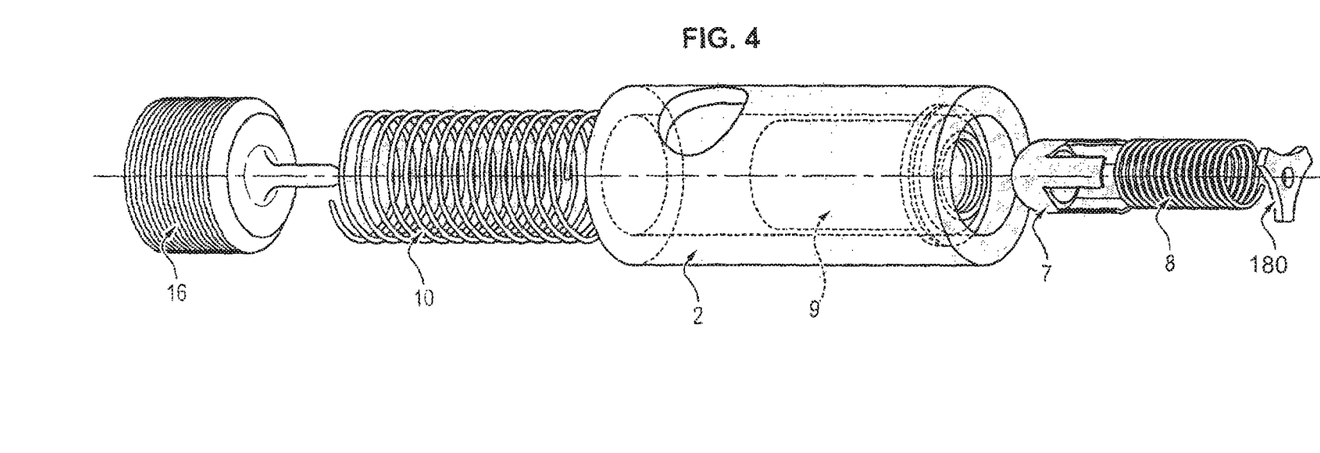
FIG. 4 shows the assemblage of elements of the device according to one embodiment of the invention.

There has been shown in FIGS. 2 to 4 an embodiment of a device 1 for a turbomachine injector.

The device 1 includes a duct 2. It is for example a duct of circular section, with a generally cylindrical shape.

The duct 2 presents at least one first opening 3, and a second opening 4.

According to one embodiment, one of the openings is practiced in a wall of the duct, allowing a circulation of fluids orthogonal to the longitudinal axis of the duct, and the other of the openings 4 is practiced at an axial end of the duct, allowing an axial circulation of the fluids.

The fluids capable of passing the duct from one opening to another are mainly the fuel of the turbomachine and the compressed air designed for purging it, or a mixture of the two.

The device 1 also includes a system 5 for blocking of the duct, allowing regulation of the passage of fluids in the duct 2.

The blocking system 5 is configured to:
allow passage of fuel from the first opening 3 toward the second opening 4 only from a first pressure (P1) of the fuel, for passage of a supply of fuel,
allowing the passage of air from the second opening 4 toward the first opening 3 only from a second pressure (P2) of the air, for passing purge air, the second pressure being greater than the first pressure.

Thus, the device 1 makes it possible to manage, via a single duct 2, both the supply of fuel, particularly to the injector, and the passage of purge air. These two fluids displace in opposite directions in the duct 2.

As can be noted, the device 1 is capable of operating in an autonomous manner.

P1 is for example, though without limitation, on the order of 2.5 to 3 bars, while P2 is for example, though without limitation, on the order of 4 to 6 bars.

In one embodiment, the blocking system 5 includes a first head 7 mounted on a first elastic module 8. The elastic module 8 includes for example a spring.

This first head 7 is capable of displacing to allow the passage of fuel from the first opening 3 toward the second opening 4, only from the first pressure P1.

In particular, under the effect of the pressure of the fuel inserted in the device 1 at its first opening 3, the first elastic module 8 is compressed and draws into its motion the first head 7.

This first head 7 thus undergoes a displacement, which is general a translation along duct axis 2. This displacement allows a circulation space in the duct 2 to be freed, allowing a fuel, introduced at the first opening 3, to escape from the duct through the second opening 4.

In this embodiment illustrated in FIG. 3, the first head 7 has the shape of a ball.

Likewise, in an embodiment, the blocking system 5 includes a second head 9 mounted on a second elastic module 10, said second head 9 being capable of displacing to allow air from the second opening 4 toward the first opening 3, solely based on the second pressure P2. The elastic module 10 includes for example a spring.

In particular, under the effect of the pressure of the compressed air inserted into the duct 2 at the level of its second opening 4, the second elastic module 10 is compressed, and draws into its motion the second head 9. This second head 9 thus undergoes a displacement, which is in general a translation along the longitudinal axis of the duct 2. This displacement makes it possible to free a circulation space in the duct, allowing the air, introduced at the level of the second opening 4, to escape from the duct by the first opening 3.

In one embodiment, the first head 7 is capable of moving inside the second head 9.

In the embodiment illustrated in the figures, the first head 7, rotationally symmetrical for example, has a diameter less than the second head 9, also rotationally symmetrical. The second head 9 has a cavity 11 passing through it from one side to the other, wherein first head 7 is capable of moving, guided by the first elastic module 8. In this case, the first elastic module 8 also extends inside the cavity 11 mentioned earlier. The first elastic module 8 can in particularly be fixed on a support 180 held by assemblage into the grooves of the second head 9. The support 180 itself has openings for the passage of fluids.

The cavity 11 is terminated in two openings 14, 15 located on both sides of the second head 7.

In the resting position, the first head 7 blocks the opening 14 of the cavity 11, which is situated on the side of the first opening 3 of the duct.

Passage of fuel into the duct 2 is therefore blocked both by the first head 7 and by the second head 9 which blocks the second opening 4 of the duct 2.

When the pressure of the fuel passes the elastic force of the elastic module 8, the first head 7 moves away from the opening 14, which allows the passage of the fuel into the duct 2 through the cavity 11, toward the second opening 4 of the duct 2.

In one embodiment, the second head 9 is of the cylindrical shape, ending in an annular crown 13 coming to rest against the edges 12 of the duct, said edges 12 surrounding the second opening 4.

The diameter of the annular crown 13 is sufficiently great to block the second opening 4 when the second head 9 is in the rest position. The pressure exerted by the air, greater than the elastic force of the second elastic module 10, makes it possible to separate the crown 13 from the edges 12, which induces a passage for the air in the duct 2. In particular, the air can spread around the second head 9, in the space present between the walls and the second head 9 and the inner walls of the duct 2.

In one embodiment, the first head 7 and the second head 9 are capable of moving in translation in the duct 2, in opposite directions.

According to one embodiment, the device 1 includes a stop 16, allowing the blockage of displacement of the first head 7 in the direction of displacement of the second head 9. The stop 16 includes in particular a base 17 terminating by a finger 18 extending in the duct 2 until the opening 14 of the second head 9.

The finger 16 blocks the translation of the first head 7 in the direction of displacement of the second head 9, which makes it possible to obtain a more complete purge. In particular, the air can flow into the cavity 11 of the second head 9, and escape from the second head by the opening 14, which is not longer completely blocked by the first head 7.

This adjustable stop 16 is flush with the first head 7 (for example, with a clearance comprised between 0.5 and 1 mm) in such a manner that the pressure of the air at the time of purging displaces the second head 9 and, in a second time period, compresses the elastic module 8. At that moment the purge air escapes at the same time between the edge 12 and the module 13, and through the opening 14.

As shown in the figures, the first elastic module 8 of the first head 7 is fixed to one end of the second head 9. Consequently, the displacement of the second head 9 (based on the second pressure P2) drives the displacement of the first head 7 in the same direction, that is toward the stop 16. This results from the force to which the first elastic module 8 was subjected.

As indicated above, the purge is therefore more complete, given that the opening 14 presents at the other end the second head 9, and previously blocked by the first head 7, is now freed.

Figure 5:
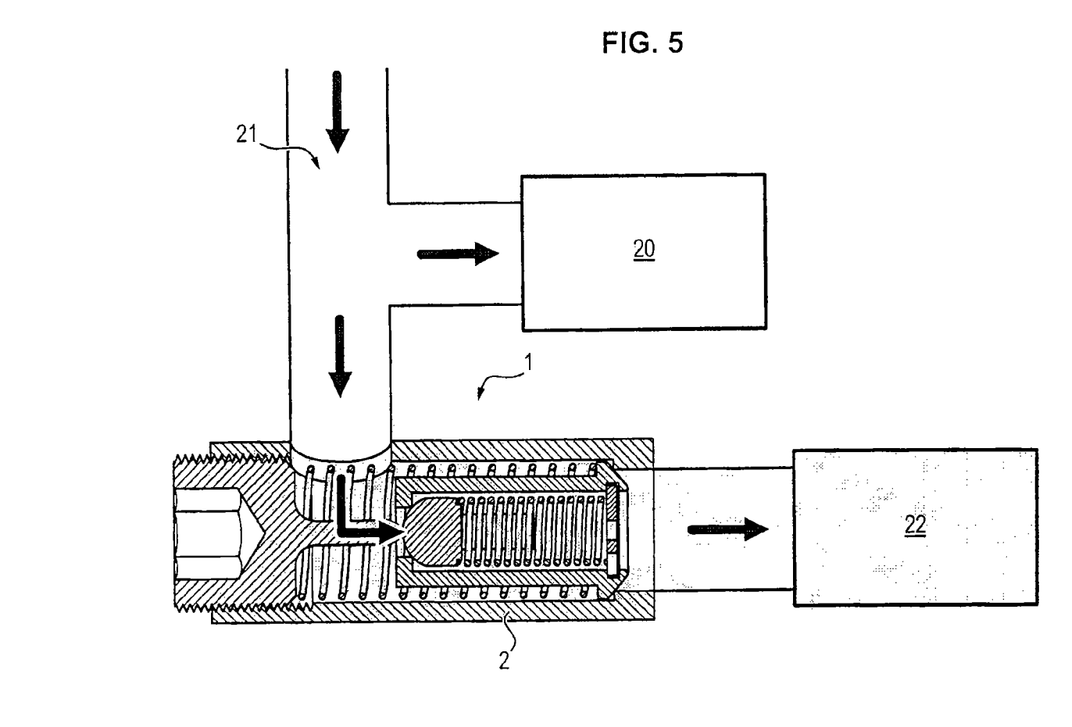
FIG. 5 shows a device associated with injection elements.

Shown in FIG. 5 a schematic drawing of a possible embodiment of the use of the device.

In the course of a first step, some fuel circulates in an injection circuit 21, at a pressure lower than the pressure allowing displacement of the first elastic module 8.

Consequently, the fuel is transmitted solely to a first injection element 20, which is for example an injection element of a starting circuit. This injection element, also called a starting injector, makes it possible to project fuel so as to ignite a portion of the combustion chamber by combustion of the fuel with a spark plug.

The pressure of the fuel in the injection circuit increases, so that the first head 7 is displaced, also allowing the passage of fuel through the duct 2 toward another injection element 22 of a main starting circuit, which is configured to project fuel to a level allowing combustion of the fuel in the entire combustion chamber, igniting the entire combustion chamber.

After extinction of the spark plug and stopping the supply in fuel, a purge is carried out, in the course of which the compressed air traveling the duct 2, in the reverse of the fuel circulation direction, as described previously. This compressed air comes generally from the compressor of the turbomachine.

This purge makes it possible to clean the different elements through which the compressed air passes, as the injection circuit, the starting circuit, the principal starting circuit and the injection elements.

Generally, a plurality of the devices can be used in conjunction with a plurality of starting circuit and injection elements. This permits the transfer of fuel at different pressures, while ensuring the possibility that the assembly is purged in a simple and effective manner.

Figure 6:
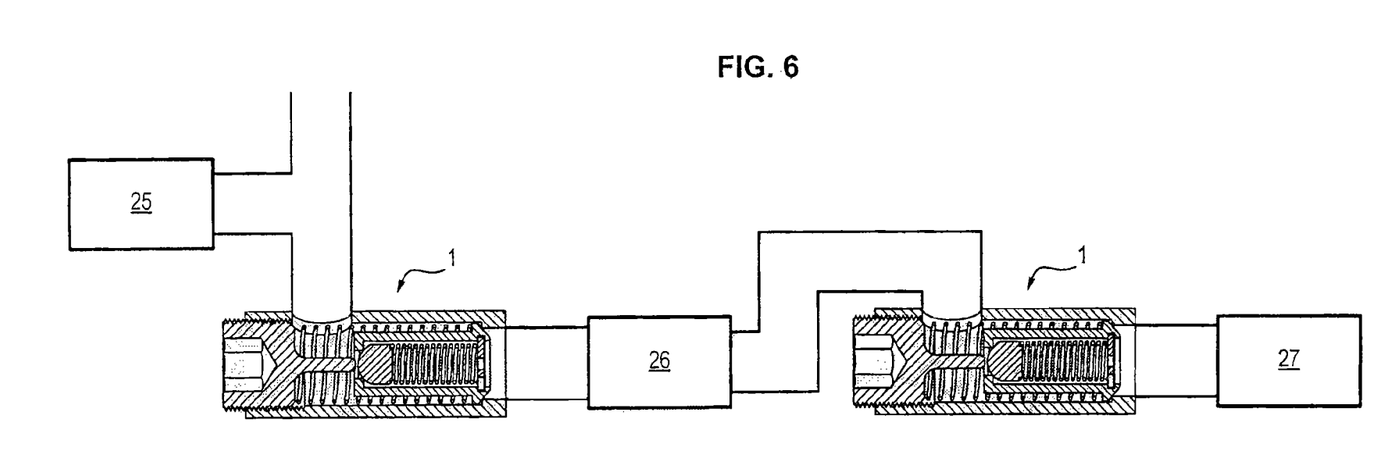
FIG. 6 shows an embodiment of an assembly including a plurality of devices according to the invention.

An assembly is thus obtained including a plurality of fuel injection elements (elements making it possible to project fuel toward the combustion chamber), and a plurality of devices of which the blocking system is configured for the passage of fuel based on the first pressures of different values, so that the injection elements are supplied with fuel at different pressures. This makes it possible to differentiate different ramps of fuel injection depending on the fuel pressure.

The purge takes place thanks to the assembly of devices, the blocking system whereof can for example be regulated to allow passage of air from the second opening toward the first opening based on a second pressure of the air common to all the devices.

Thus, in FIG. 6:
the injection element 25 receives fuel from the pressure P1;
the injection element 26 receives fuel from the pressure P2, with P2>P1;
the injection element 27 receives fuel from the pressure P3, with P3>P2.

With such a configuration, it is possible to ignite in cascade the injection elements, and hence, it is possible to ignite in cascade the chamber injectors arranged in series, based on a common supply of fuel. The injectors of the chamber are therefore operated based on the value of the fuel pressure compared to the pressures P1, P2 and P3.

Figure 7:
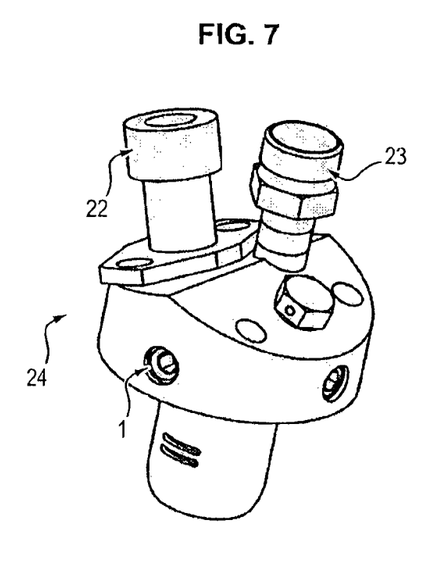
FIG. 7 shows an embodiment of an injector of a combustion chamber according to the invention.

Shown schematically in FIG. 7 is an embodiment of a combustion chamber injector 24 of a turbomachine. It includes a spark plug 22 for igniting the fuel, and an arrival 23 of fuel. The injector includes the device as described previously. It can also be used according to the arrangement as described in reference to FIG. 6, wherein a plurality of circuits and fuel injection elements are used.

This combustion chamber is inserted in conventional fashion into a turbomachine. The injector of the combustion chamber is generally inserted to a casing of the combustion chamber of the turbomachine.

The invention claimed is:

1. A device for combustion chamber injector in a turbomachine, comprising:
  a duct having at least:
    a first opening, and
    a second opening; and
  a system for blocking the duct, said system being configured to regulate the passage of fluids in the duct, the blocking system including:
    a first head mounted on a first elastic module, said first head being capable of displacing to allow passage of fuel from the first opening to the second opening only from a first pressure of the fuel, for passage of a supply of fuel,
    a second head mounted on a second elastic module, said second head being capable of displacing to allow transfer of air from the second opening to the first opening from a second pressure of the air, to allow passage of air from the second opening to the first opening only from the second pressure of the air, for passage of purge air, the second pressure of the air being greater than the first pressure of the fuel, and
    a stop allowing blockage of the displacement of the first head in a direction of displacement of the second head,
  wherein the first elastic module of the first head is fixed at one end of the second head, such that the displacement of the second head from the second pressure drives the displacement of the first head toward the stop, and
  wherein the first head is capable of moving inside the second head.

2. The device according to claim 1, wherein the first head and the second head are capable of moving in translation in the duct, in opposite directions.

3. An assembly including:
  a plurality of fuel injection elements, and
  a plurality of devices according to claim 1, the blocking system whereof is configured for passage of fuel from first pressures of different values, such that the injection elements are supplied with fuel from different pressures.

4. An injector for a combustion chamber of a turbomachine, comprising a device according to claim 1.

5. A turbomachine including a combustion chamber injector according to claim 4.

6. The device according to claim 1, wherein the second head includes a cavity, the first head and the first elastic module are disposed inside the cavity, and the first head moves towards the second opening from the first pressure of the fuel.

7. The device according to claim 6, wherein the second elastic module surrounds a portion of the second head, a first end of the second elastic module abuts the stop and a second end of the second elastic module abuts an annular crown at an end of the second head.

8. The device according to claim 7, wherein the annular crown rests against edges of the duct surrounding the second opening.

* * * * *